(12) United States Patent
Okaichi et al.

(10) Patent No.: US 9,874,114 B2
(45) Date of Patent: Jan. 23, 2018

(54) COGENERATING SYSTEM

(71) Applicant: Panasonic Intellectual Property Management Co., Ltd., Osaka (JP)

(72) Inventors: Atsuo Okaichi, Osaka (JP); Takumi Hikichi, Osaka (JP); Osao Kido, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 252 days.

(21) Appl. No.: 14/791,066

(22) Filed: Jul. 2, 2015

(65) Prior Publication Data
US 2016/0017760 A1    Jan. 21, 2016

(30) Foreign Application Priority Data
Jul. 17, 2014    (JP) ................................ 2014-146430

(51) Int. Cl.
| | | |
|---|---|---|
| *F01K 23/04* | (2006.01) | |
| *F01K 17/02* | (2006.01) | |
| *F24D 3/08* | (2006.01) | |

(52) U.S. Cl.
CPC .............. *F01K 23/04* (2013.01); *F01K 17/02* (2013.01); *F24D 3/08* (2013.01); *F24H 2240/127* (2013.01); *Y02E 20/14* (2013.01)

(58) Field of Classification Search
CPC ........ F01K 9/003; F01K 17/005; F01K 23/10; F01K 25/10; F02C 1/10; F02C 6/18; Y02E 20/16; Y02E 20/14; F05D 2210/10
See application file for complete search history.

(56) References Cited

U.S. PATENT DOCUMENTS

| | | | | | |
|---|---|---|---|---|---|
| 4,586,338 | A | * | 5/1986 | Barrett | .................... F01D 1/023 |
| | | | | | 60/618 |
| 5,000,003 | A | * | 3/1991 | Wicks | ................... F01K 23/065 |
| | | | | | 60/618 |

(Continued)

FOREIGN PATENT DOCUMENTS

WO    2014/087639    6/2014

OTHER PUBLICATIONS

The Extended European Search Report dated Dec. 23, 2015 for the related European Patent Application No. 15175905.7.

*Primary Examiner* — Mark Laurenzi
*Assistant Examiner* — Shafiq Mian
(74) *Attorney, Agent, or Firm* — McDermott Will & Emery LLP

(57) ABSTRACT

A cogenerating system includes a Rankine cycle, a high-temperature heat transfer medium circuit, a low-temperature heat transfer medium circuit, a bypass channel, a heat exchanger, and a flow rate adjustment mechanism. The high-temperature heat transfer medium circuit is configured such that an evaporator is supplied with a high-temperature heat transfer medium by a high-temperature heat transfer medium heat exchanger. The low-temperature heat transfer medium circuit is configured such that a condenser is supplied with a low-temperature heat transfer medium by a low-temperature heat transfer medium heat exchanger. The flow rate adjustment mechanism includes at least a flow rate limiter that limits the flow rate of the high-temperature heat transfer medium to be supplied to the evaporator, and adjusts a ratio of the flow rate of the high-temperature heat transfer medium flowing through the bypass channel to the flow rate of the high-temperature heat transfer medium flowing through the evaporator.

17 Claims, 9 Drawing Sheets

(56) References Cited

U.S. PATENT DOCUMENTS

| | | | | |
|---|---|---|---|---|
| 6,234,400 B1* | 5/2001 | Guyer | ............ | F01K 17/02 237/12.1 |
| 7,243,618 B2* | 7/2007 | Gurevich | ............ | F22B 1/1815 122/406.1 |
| 7,841,306 B2* | 11/2010 | Myers | ............ | F01D 15/10 122/406.5 |
| 7,971,424 B2* | 7/2011 | Masada | ............ | F01K 9/003 60/39.182 |
| 8,141,362 B2 | 3/2012 | Benstead et al. | | |
| 8,544,273 B2* | 10/2013 | Brenmiller | ............ | F03G 6/067 60/641.8 |
| 9,074,585 B2* | 7/2015 | Leibowitz | ............ | F01K 23/04 |
| 9,243,518 B2* | 1/2016 | Cook | ............ | F01K 13/02 |
| 9,322,300 B2* | 4/2016 | Mirmobin | ............ | F03G 7/04 |
| 2005/0188711 A1* | 9/2005 | Wang | ............ | B60H 1/00878 62/238.6 |
| 2006/0005557 A1* | 1/2006 | Takano | ............ | B60H 1/00878 62/238.6 |
| 2009/0021174 A1* | 1/2009 | Feldtkeller | ............ | H05B 41/2828 315/117 |
| 2009/0211253 A1* | 8/2009 | Radcliff | ............ | F01K 23/065 60/670 |
| 2009/0211734 A1 | 8/2009 | Benstead et al. | | |
| 2009/0277173 A1* | 11/2009 | Ernst | ............ | F01K 23/065 60/616 |
| 2010/0242474 A1* | 9/2010 | Berger | ............ | F01K 25/10 60/641.2 |
| 2010/0263380 A1* | 10/2010 | Biederman | ............ | F01K 23/065 60/651 |
| 2010/0307155 A1* | 12/2010 | Kasuya | ............ | F01K 23/065 60/666 |
| 2010/0326076 A1* | 12/2010 | Ast | ............ | F01K 23/04 60/671 |
| 2012/0111003 A1* | 5/2012 | Kasuya | ............ | F01K 13/02 60/618 |
| 2012/0131921 A1* | 5/2012 | Held | ............ | F01K 25/08 60/671 |
| 2012/0192563 A1* | 8/2012 | Kauffman | ............ | F01K 9/003 60/671 |
| 2012/0198839 A1* | 8/2012 | Nelson | ............ | F01N 5/02 60/605.1 |
| 2012/0216762 A1* | 8/2012 | Ernst | ............ | F01N 5/02 123/41.21 |
| 2013/0014505 A1* | 1/2013 | Enokijima | ............ | F01K 23/065 60/615 |
| 2013/0180474 A1* | 7/2013 | Wilhelm | ............ | F28F 9/013 122/406.4 |
| 2013/0219894 A1* | 8/2013 | Bannister | ............ | F01K 17/02 60/671 |
| 2014/0028033 A1* | 1/2014 | Mirmobin | ............ | F01K 25/08 290/40 R |
| 2014/0311141 A1* | 10/2014 | Mori | ............ | F02G 5/00 60/599 |
| 2014/0345275 A1* | 11/2014 | Ernst | ............ | F01N 5/02 60/618 |
| 2015/0267569 A1 | 9/2015 | Hikichi et al. | | |

* cited by examiner

COGENERATING SYSTEM

BACKGROUND

1. Technical Field

The present disclosure relates to a cogenerating system.

2. Description of the Related Art

A Rankine cycle apparatus is available as a power generating apparatus. Another available system in the related art includes a Rankine cycle, and a heat transfer circuit including a condenser that operates as an evaporator of the Rankine cycle and is connected to the Rankine cycle.

U.S. Pat. No. 8,141,362 discloses a system 300 including a heat transfer circuit 340 and a Ranking cycle 350 as illustrated in FIG. 9. The heat transfer circuit 340 includes a boiler 310 as an evaporator, a condenser 313, a first fluid duct 312, a second fluid duct 315, an expander 316, an additional condenser 323, and a valve 324. The first fluid duct 312 connects the outlet of the boiler 310 to the condenser 313. The second fluid duct 315 is connected to the condenser 313 to return a condensed fluid to the boiler 310. The heat transfer circuit 340 is filled with water. The additional condenser 323 is selectively connected to the second fluid duct 315 by the valve 324. The Ranking cycle 350 includes the condenser 313, an expander 330, an economizer 331, a condenser 332, a pump 333, and a heating circuit 334a. The condenser 313 functions as an evaporator in the Ranking cycle 350.

The boiler 310, if operated, generates vapor, and part of the boiler 310 and the first fluid duct 312 are filled with vapor. When vapor reaches the condenser 313, the condenser 313 performs a heat exchange operation. Heat is thus conducted from the boiler 310 to the condenser 313 via the first fluid duct 312. As an amount of heat continues to increase, vapor spreads, increasing pressure and temperature thereof. An amount of heat transfer increases in the condenser 313. If the pressure in the heat transfer circuit 340 exceeds a predetermined level, the valve 324 automatically opens for safety purposes, causing the additional condenser 323 to remove excessive heat. The pressure of vapor falls to an appropriate level.

As the vapor condenses in the condenser 313, a working fluid of the Ranking cycle 350 evaporates. Resulting vapor drives the expander 330, generating motive power before low-pressure vapor is condensed in the condenser 332. The working fluid is then returned to the condenser 313 by the pump 333. The condenser 332 radiates heat of the low-pressure vapor to the heating circuit 334a.

The system 300 disclosed in U.S. Pat. No. 8,141,362 has room for improvements in terms of adaptability to a large amount of heat demand.

SUMMARY

One non-limiting and exemplary embodiment provides a cogenerating system having higher adaptability to a large amount of heat demand.

In one general aspect, the techniques disclosed here feature a cogenerating system. The cogenerating system includes a first circuit that circulates a first heat transfer medium flowing therein, a Rankine cycle that circulates a working fluid flowing therein, a second circuit that circulates a second heat transfer medium flowing therein, a temperature of the second heat transfer medium being lower than a temperature of the first medium, a first heat source, a first heat exchanger that is disposed on the first circuit, transfers heat of the first heat source to the first heat transfer medium, and evaporates the working fluid, a second heat exchanger that is disposed sharedly on the first circuit and the Rankine cycle, and transfers heat of the first heat transfer medium to the working fluid, a pump that is disposed on the Rankine cycle, and circulates the working fluid, an expander that is disposed on the Rankine cycle, and expands the working fluid, a third heat exchanger that is disposed sharedly on the Rankine cycle and the second circuit, transfers heat of the working fluid to the second heat transfer medium, and condenses the expanded working fluid, a second heat source having a temperature lower than a temperature of the first heat source, a fourth heat exchanger that is disposed on the second circuit, and transfers heat of the second heat transfer medium to the second heat source. The first circuit includes a first portion and a second portion, the first portion being located between a portion where the first heat transfer medium flows out from the first heat exchanger and a portion where the first heat transfer medium flows into the second heat exchanger, the second portion being located between a portion where the first heat transfer medium flows out from the second heat exchanger and a portion where the first heat transfer medium flows into the first heat exchanger. The cogenerating system further includes a first bypass channel that that connects the first portion to the second portion of the first circuit to flow the first heat transfer medium from the first portion to the second portion, a fifth heat exchanger that is disposed sharedly on the second circuit and the first bypass channel, and transfers heat of the first heat transfer medium to the second heat transfer medium, and an adjustment mechanism that adjusts a ratio of an amount of the first heat transfer medium flowing in the first bypass channel to an amount of the first heat transfer medium flowing into the second heat exchanger in the first circuit.

The disclosure provides a cogenerating system having higher adaptability to a large amount of heat demand.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
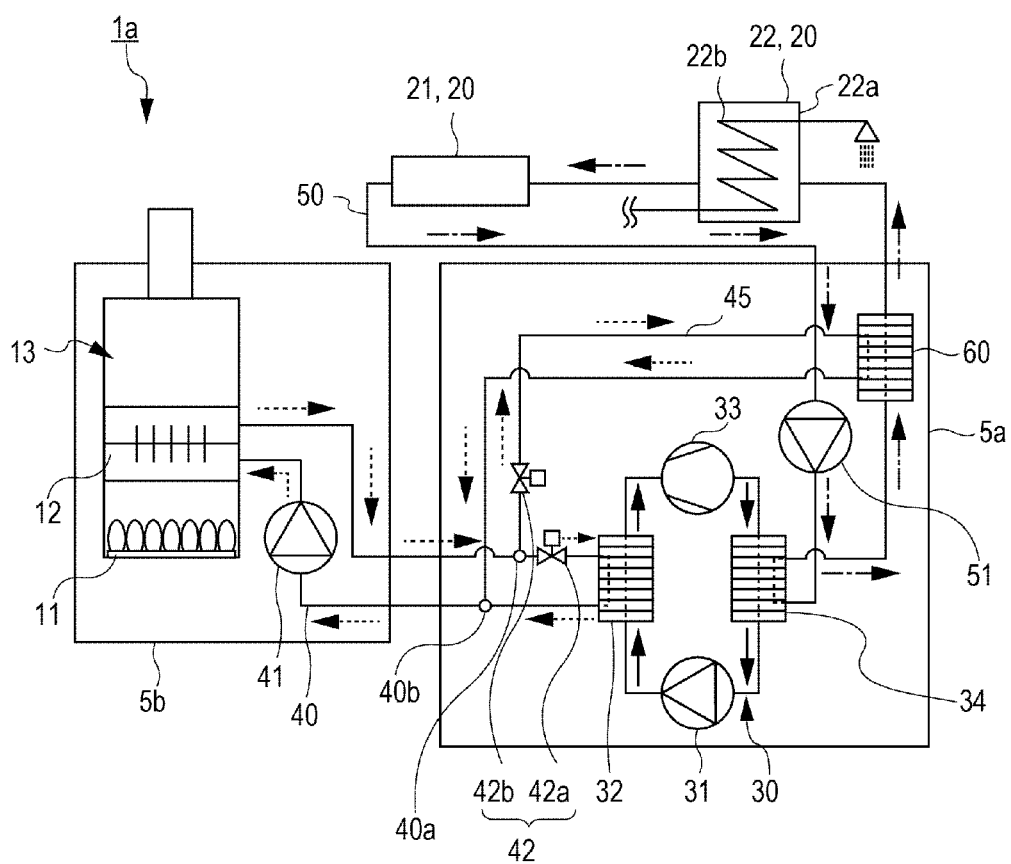
FIG. 1 illustrates the configuration of a cogenerating system of a first embodiment of the disclosure.

A heat to power ratio is desirably adjustable in a cogenerating system using a Rankine cycle. In particular, if an amount of heat supplied to a low-temperature heat transfer medium in a condenser of the Rankine cycle is not sufficient in a high heat demand environment, it is contemplated that heat gained from a high-temperature heat source is directly supplied to the low-temperature not via the Rankine cycle. According to U.S. Pat. No. 8,141,362, the adjustment of the heat to power ratio responsive to the heat demand is not specifically studied. Even if the heat to power ratio is adjustable in the system 300 disclosed in U.S. Pat. No. 8,141,362, it is difficult to determine that the system 300 has sufficient adaptability to a high heat demand. This is because even if the valve 324 is opened, an adjustable control range of a ratio of an amount of vapor flow F2 supplied to the additional condenser 323 to an amount of vapor flow F1 supplied to the condenser 313 (F2/F1) is limited. A variation in the ratio is not controllable to any particular value.

In the system 300, the magnitude of the ratio F2/F1 with the valve 324 opened is affected by a heat transfer area, a passage shape, or a state of the low-temperature fluid in each of the condenser 313 and the additional condenser 323. For example, the additional condenser 323 is supplied with a fluid heated by the condenser 332 of the Ranking cycle 350, the vapor filling the heat transfer circuit 340 is cooled and condensed. The condenser 313 is supplied with a working fluid in a liquid state or a gas-liquid state with the pump 333 operating. The evaporating temperature of the working fluid in the condenser 313 is determined by pressure of the working fluid in the condenser 313, and is thus varied depending on the operational status of the expander 330 or the pump 333 or the temperature of the fluid supplied to the condenser 332. The magnitude of the ratio F2/F1 with the valve 324 opened is determined by a vapor condensation speed that is in turn determined by the course of events. As a result, the magnitude of the ratio F2/F1 is limited to a particular range.

According to a first aspect of the disclosure, there is provided a cogenerating system. The cogenerating system includes a first circuit that circulates a first heat transfer medium flowing therein, a Rankine cycle that circulates a working fluid flowing therein, a second circuit that circulates a second heat transfer medium flowing therein, a temperature of the second heat transfer medium being lower than a temperature of the first medium, a temperature of the working fluid being lower than the temperature of the first medium, the temperature of the second heat transfer medium being lower than the temperature of the working fluid, a first heat source, a first heat exchanger that is disposed on the first circuit, transfers heat of the first heat source to the first heat transfer medium, and evaporates the working fluid, a second heat exchanger that is disposed sharedly on the first circuit and the Rankine cycle, and transfers heat of the first heat transfer medium to the working fluid, a pump that is disposed on the Rankine cycle, and circulates the working fluid, an expander that is disposed on the Rankine cycle, and expands the working fluid, a third heat exchanger that is disposed sharedly on the Rankine cycle and the second circuit, transfers heat of the working fluid to the second heat transfer medium, and condenses the expanded working fluid, a second heat source having a temperature lower than a temperature of the first heat source, a fourth heat exchanger that is disposed on the second circuit, and transfers heat of the second heat transfer medium to the second heat source. The first circuit includes a first portion and a second portion, the first portion being located between a portion where the first heat transfer medium flows out from the first heat exchanger and a portion where the first heat transfer medium flows into the second heat exchanger, the second portion being located between a portion where the first heat transfer medium flows out from the second heat exchanger and a portion where the first heat transfer medium flows into the first heat exchanger. The cogenerating system further includes a first bypass channel that that connects the first portion to the second portion of the first circuit to flow the first heat transfer medium from the first portion to the second portion, a fifth heat exchanger that is disposed sharedly on the second circuit and the first bypass channel, and transfers heat of the first heat transfer medium to the second heat transfer medium, and an adjustment mechanism that adjusts a ratio of an amount of the first heat transfer medium flowing in the first bypass channel to an amount of the first heat transfer medium flowing into the second heat exchanger in the first circuit.

According to the first aspect, the adjustment mechanism increases the flow rate of the first heat transfer medium (high-temperature heat transfer medium) to be supplied to a heat transfer medium heat exchanger via the first bypass channel while limiting the first heat transfer medium to be supplied to the second heat exchanger (evaporator). For this reason, the adjustment mechanism widens a range of an adjustable ratio of a flow rate Fb of the first heat transfer medium (high-temperature heat transfer medium) flowing through the first bypass channel to a flow rate Fa of the first heat transfer medium (high-temperature medium) to be supplied to the second heat exchanger (evaporator). The cogenerating system is thus enabled to adapt the heat to power ratio to a high level of heat demand.

According to a second aspect of the disclosure, in view of the first aspect, the adjustment mechanism may include a first valve and a second valve. The first valve may be located between the first portion and the portion where the first heat transfer medium flows into the second heat exchanger in the first circuit, and the second valve may be located on the first bypass channel. According to the second aspect, the ratio Fb/Fa is finely adjusted within a wide range by controlling the degree of opening of the first valve (main flow rate adjustment valve) and the degree of opening of the second valve (bypass flow rate adjustment valve). If the first valve (main flow rate adjustment valve) is fully opened when the first heat transfer medium is supplied to only the second heat exchanger (evaporator), a rise in a pressure loss of the flow of the first heat transfer medium (high-temperature heat transfer medium) in the first circuit is controlled. According to the second aspect, the generation efficiency of the Rankine cycle is maintained high while the cogenerating system is adapted to a higher level of heat demand.

According to a third aspect of the disclosure, in view of the second aspect, the first valve may include a fixed throttle valve. According to the third aspect, the flow rate of the first heat transfer medium (high-temperature heat transfer medium) to be supplied to the fifth heat exchanger (heat transfer medium heat exchanger) is reduced by narrowing the degree of opening of the second valve (bypass flow rate adjustment valve) if the heat demand is lower. If the second valve (bypass flow rate adjustment valve) is fully closed, the first heat transfer medium (high-temperature heat transfer medium) is supplied only to the second heat exchanger (evaporator). If the heat demand is higher, the ratio Fb/Fa is increased by increasing the degree of opening of the second valve (bypass flow rate adjustment valve). A radiation amount of heat from the first heat transfer medium (high-temperature heat transfer medium) to the second heat transfer medium (low-temperature heat transfer medium) is adapted to the heat demand. Since the number of valves included in the adjustment mechanism is smaller, the manufacturing costs are lower. The heat to power ratio of the cogenerating system is thus efficiently adapted to the heat demand while power generation is maintained.

According to a fourth aspect of the disclosure, in view of the first aspect, the adjustment mechanism may include a three way valve, and is located at the first portion of the first circuit. According to the fourth aspect, controlling the three way valve allows the ratio of Fb/Fa to be finely adjusted in a wider range. Since the ratio of Fb/Fa is adjusted by only the three way valve, the component count is reduced, leading to lower manufacturing costs. Even if the three way valve is controlled such that the first heat transfer medium (high-temperature heat transfer medium) flows into only the second heat exchanger (evaporator), a rise in the pressure loss of the flow of the first heat transfer medium (high-temperature heat transfer medium) is controlled. The heat to power ratio of the cogenerating system is thus efficiently adapted to the heat demand while power generation is maintained.

According to a fifth aspect of the disclosure, in view of the first aspect, in the second circuit, the fifth heat exchanger may be located between a portion where the second heat transfer medium flows out from the third heat exchanger and a portion where the second heat transfer medium flows into the fourth heat exchanger.

According to the fifth aspect, the second heat transfer medium (low-temperature heat transfer medium) lower in temperature than the second heat transfer medium (low-temperature heat transfer medium) to be supplied to the fifth heat exchanger (heat transfer medium heat exchanger) is supplied to the third heat exchanger (condenser). Since a difference increases between the temperature of the first heat transfer medium (high-temperature heat transfer medium) to be supplied to the second heat exchanger (evaporator) and the second heat transfer medium (low-temperature heat transfer medium) to be supplied to the third heat exchanger (condenser), the generation efficiency of the Rankine cycle increases. The cogenerating system is thus operated with a higher power value in the heat to power ratio, and the range of the adjustable heat to power ratio is wider.

According to a sixth aspect of the disclosure, in view of one of the first through fifth aspects, the cogenerating system may further include a first tank (high-temperature expansion tank) that is disposed on the first circuit, and stores a part of the first heat transfer medium, or a second tank (low-temperature expansion tank) that is disposed on the second circuit, and stores a part of the second heat transfer medium. According to the sixth aspect, if the first heat transfer medium (high-temperature heat transfer medium) or the second heat transfer medium (low-temperature heat transfer medium) increases in volume in response to a temperature rise in the first heat transfer medium (high-temperature heat transfer medium) or the second heat transfer medium (low-temperature heat transfer medium), a pressure rise in the first circuit (high-temperature heat transfer medium circuit) or the second circuit (low-temperature heat transfer medium circuit) is controlled. Even if operating conditions of the cogenerating system change, the reliability of the first circuit (high-temperature heat transfer medium circuit) or the second circuit (low-temperature heat transfer medium circuit) increases, leading to increasing the reliability of the cogenerating system as well.

According to a seventh aspect of the disclosure, in view of one of the first through sixth aspects, the boiling point of the first heat transfer medium at atmospheric pressure may be higher than an operating temperature of the first heat transfer medium. According to the seventh aspect, the first heat transfer medium (high-temperature heat transfer medium) is mainly in a liquid phase. Since the first heat transfer medium (high-temperature heat transfer medium) in the gas phase is present in the first circuit (high-temperature heat transfer medium circuit) in response to the vapor pressure at the operating temperature, the pressure of the first circuit (high-temperature heat transfer medium circuit) is lower than the atmospheric pressure. Even if the operating conditions of the cogenerating system change, the pressure of the first circuit (high-temperature heat transfer medium circuit) is still lower. This cuts down on an increase in the manufacturing costs of the cogenerating system.

According to an eighth aspect of the disclosure, in view of one of the first through seventh aspects, the cogenerating system may further include a burner that generates combustion gas, the combustion gas constituting the first heat source, a gas passage where the combustion gas flows, and a sixth heat exchanger that is disposed sharedly on the gas passage and the second circuit, recovers latent heat of the combustion gas, and transfers the latent heat of the combustion gas to the second heat transfer medium. The first heat exchanger is disposed on the gas passage. In the gas passage, the sixth heat exchanger is located on the downstream side of the first heat exchanger in a flowing direction of the combustion gas. In the second circuit, the sixth heat exchanger is located between a portion where the second heat transfer medium flows out from the fourth heat exchanger and a portion where the second heat transfer medium flows into the third heat exchanger.

According to the eighth aspect, the first heat exchanger (high-temperature heat transfer medium heat exchanger) exchanges heat between the combustion gas generated by the burner and the first heat transfer medium (high-temperature heat transfer medium). The first heat source (high-temperature heat source) having a high temperature thus heats the first heat transfer medium (high-temperature heat transfer medium) to a predetermined temperature. The sixth heat exchanger (latent heat recovery heat exchanger 70a) exchanges heat between the combustion bus having flown through the first heat exchanger (high-temperature heat transfer heat exchanger) and the second heat transfer medium (low-temperature heat transfer medium). This heat exchange is performed before the second heat transfer medium (low-temperature heat transfer medium) receives heat from the working fluid of the Rankine cycle at the third heat exchanger (condenser). In this way, the sixth heat exchanger (latent heat recovery heat exchanger 70a) recovers the latent heat of the combustion gas. As a result, the combustion energy of the fuel from the burner is efficiently used.

According to a ninth aspect of the disclosure, in view of the first through seventh aspect, the first circuit may include a third portion and a fourth portion, the third portion being located between the second portion and the portion where the first heat transfer medium flows into the first heat exchanger, the fourth portion being located between the third portion and the portion where the first heat transfer medium flows into the first heat exchanger. The cogenerating system may further include a burner that generates combustion gas, the combustion gas constituting the heat source, a gas passage where the combustion gas flows, a second bypass channel that connects the third portion to the fourth portion of the first circuit, causing the first heat transfer medium to flow from the third portion to the fourth portion, a sixth heat exchanger that is disposed sharedly on the gas passage and the second bypass channel, and transfers heat of the heat source to the first heat transfer medium. The first heat exchanger is disposed on the gas passage. In the gas passage, the sixth heat exchanger is located on the downstream side of the first heat exchanger in a flowing direction of the combustion gas. The cogenerating system may further include a third valve, located on the second bypass channel.

According to the ninth aspect, the first heat exchanger (high-temperature heat transfer medium heat exchanger) exchanges heat between the combustion gas generated by the burner the first heat transfer medium (high-temperature heat transfer medium). The first heat source (high-temperature heat source) having a high temperature heats the first heat transfer medium (high-temperature heat transfer medium) to a predetermined temperature. The sixth heat exchanger (latent heat recovery heat exchanger 70*b*) exchanges heat between the combustion gas having flown through the first heat exchanger (high-temperature heat transfer medium heat exchanger) and the first heat transfer medium (high-temperature heat transfer medium) that is lowered in temperature as a result of heat exchanging with the working fluid of the Rankine cycle in the second heat exchanger (evaporator). The sixth heat exchanger (latent heat recovery heat exchanger 70*b*) thus recovers latent heat of the combustion gas. As a result, the combustion energy of a fuel provided by the burner is efficiently used. According to the ninth aspect, part of the first heat transfer medium (high-temperature heat transfer medium) flowing through the first circuit (high-temperature heat transfer medium circuit) flows through the second bypass channel (sub channel). The flow rate of the first heat transfer medium (high-temperature heat transfer medium) flowing through the second bypass channel (sub channel) is adjusted by controlling the third valve disposed on the second bypass channel (sub channel). One end (fourth portion) of the second bypass channel (sub channel) is connected to a location of a main channel of the second bypass channel (sub channel) closer to an inlet of the first heat exchanger (high-temperature heat transfer medium heat exchanger) than the other end of the second bypass channel (sub channel) is. In this way, the first heat transfer medium (high-temperature heat transfer medium) guided into the second bypass channel (sub channel) flows through the sixth heat exchanger (latent heat recovery heat exchanger 70*b*) and meets the flow of the first heat transfer medium (high-temperature heat transfer medium) at a location closer to the inlet of the first heat exchanger (high-temperature heat transfer medium heat exchanger). The first heat transfer medium (high-temperature heat transfer medium) is guided into the second bypass channel (sub channel) by the pressure loss of the flow of the first heat transfer medium (high-temperature heat transfer medium) in the first circuit (high-temperature heat transfer medium circuit). The second bypass channel (sub channel) is thus simply formed.

According to a tenth aspect of the disclosure, in view of the ninth aspect, the cogenerating system may further include a seventh heat exchanger that is disposed sharedly on the second circuit and the second bypass channel, and transfers heat of the first heat transfer medium to the third heat transfer medium. In the second bypass channel, the third portion, the seventh heat exchanger, the sixth heat exchanger and the forth portion are arranged in this order. According to the tenth aspect, the sixth heat exchanger (latent heat recovery heat exchanger 70*b*) exchanges heat between the combustion gas having flowed through the first heat exchanger (high-temperature heat transfer medium heat exchanger) and the first heat transfer medium (high-temperature heat transfer medium). Heat exchange is further performed when the temperature of the first heat transfer medium (high-temperature heat transfer medium) is lowered in temperature after the seventh heat exchanger (heat transfer medium cooling heat exchanger 80*a*) exchanges heat between the first heat transfer medium (high-temperature heat transfer medium) and the second heat transfer medium (low-temperature heat transfer medium). In this way, the sixth heat exchanger (latent heat recovery heat exchanger 70*b*) recovers the latent heat of the combustion gas. As a result, the combustion energy of the fuel from the burner is efficiently used. According to the tenth aspect, part of the first heat transfer medium (high-temperature heat transfer medium) flowing through the first circuit (high-temperature heat transfer medium circuit) flows through the second bypass channel (sub channel). The flow rate of the first heat transfer medium (high-temperature heat transfer medium) flowing through the second bypass channel (sub channel) is adjusted by controlling the third valve disposed on the second bypass channel (sub channel). In this way, the temperature of the first heat transfer medium (high-temperature heat transfer medium) having flown through the seventh heat exchanger (heat transfer medium cooling heat exchanger 80*a*) is adjusted. For example, the temperature of the first heat transfer medium (high-temperature heat transfer medium) having flown through the seventh heat exchanger (heat transfer medium cooling heat exchanger 80*a*) is lowered by causing the third valve to reduce the flow rate of the first heat transfer medium (high-temperature heat transfer medium) flowing through the second bypass channel (sub channel). Since the sixth heat exchanger (latent heat recovery heat exchanger 70*b*) is supplied with the first heat transfer medium (high-temperature heat transfer medium) that has lowered in temperature as a result of heat exchange by the seventh heat exchanger (heat transfer medium cooling heat exchanger 80*a*), the sixth heat exchanger (latent heat recovery heat exchanger 70*b*) recovers the latent heat of the combustion gas. The combustion energy of the fuel from the burner is efficiently used. According to the tenth aspect, the first heat transfer medium (high-temperature heat transfer medium) low in temperature, before rising in temperature through the first heat exchanger (high-temperature heat transfer medium heat exchanger), flows through the second bypass channel (sub channel). For this reason, the first heat transfer medium (high-temperature heat transfer medium) is lowered more in temperature as a result of heat exchange with the second heat transfer medium (low-temperature heat transfer medium) at the seventh heat exchanger (heat transfer medium cooling heat exchanger 80*a*). The first heat transfer medium (high-temperature heat transfer medium) supplied to the sixth heat exchanger (latent heat recovery heat exchanger 70*b*) falls even more in temperature. As a result, the sixth heat exchanger (latent heat recovery heat exchanger 70*b*) has an increased recovery rate of the latent heat of the combustion gas, and the combustion energy of the fuel from the burner is efficiently used.

According to an eleventh aspect of the disclosure, in view of the tenth aspect, in the second circuit, the seventh heat exchanger is located between a portion where the second heat transfer medium flows out from the fourth heat exchanger and a portion where the second heat transfer medium flows into the third heat exchanger. According to the eleventh aspect, the second heat transfer medium (low-temperature heat transfer medium) low in temperature before being heat exchanged by the third heat exchanger (condenser) is supplied to the seventh heat exchanger (heat transfer medium cooling heat exchanger 80a). Since through this process, the first heat transfer medium (high-temperature heat transfer medium) to be supplied to the sixth heat exchanger (latent heat recovery heat exchanger 70b) is lowered more in temperature, the sixth heat exchanger (latent heat recovery heat exchanger 70b) has an increased recovery rate of the latent heat of the combustion gas and the combustion energy of the fuel from the burner is efficiently used.

According to a twelfth aspect of the disclosure, in view of the eleventh aspect, in the second circuit, the fifth heat exchanger is located between a portion where the second heat transfer medium flows out from the third heat exchanger and a portion where the second heat transfer medium flows into the fourth heat exchanger. According to the twelfth aspect, the second heat transfer medium (low-temperature heat transfer medium) low in temperature, before rising in temperature at the third heat exchanger (condenser) and the fifth heat exchanger (heat transfer medium heat exchanger), is supplied to the seventh heat exchanger (heat transfer medium cooling heat exchanger 80a). Since the first heat transfer medium (high-temperature heat transfer medium) to be supplied to the sixth heat exchanger (latent heat recovery heat exchanger 70b) is lowered more in temperature, the sixth heat exchanger (latent heat recovery heat exchanger 70b) has an increased recovery rate of the latent heat of the combustion gas and the combustion energy of the fuel from the burner is efficiently used.

According to a thirteenth aspect of the disclosure, in view of the first aspect, the cogenerating system may further include a burner that generates combustion gas, the combustion gas constituting the heat source, a gas passage where the combustion gas flows, a third circuit that circulates a third heat transfer medium flowing therein, a temperature of the third heat transfer medium being lower than a temperature of the first heat transfer medium and being higher than a temperature of the second heat transfer medium, and a sixth heat exchanger that is disposed sharedly on the gas passage and the second bypass channel, and transfers heat of the first heat source to the third heat transfer medium. The first heat exchanger is disposed on the gas passage. The sixth heat exchanger is located on the downstream side of the first heat exchanger in a flowing direction of the combustion gas in the gas passage. The cogenerating system may further include a seventh heat exchanger that is disposed sharedly on the second circuit and the third circuit, and transfers heat of the third heat transfer medium to the second heat transfer medium.

According to the thirteenth aspect, the first heat exchanger (high-temperature heat transfer medium heat exchanger) exchanges heat between the first heat transfer medium (high-temperature heat transfer medium) and the combustion gas generated by the burner, and the first heat transfer medium (high-temperature heat transfer medium) is thus heated to a predetermined temperature by the first heat source (high-temperature heat source) having a high temperature. The sixth heat exchanger (latent heat recovery heat exchanger 70c) exchanges heat between the combustion gas having flown through the first heat exchanger (high-temperature heat transfer medium heat exchanger) and the third heat transfer medium (medium-temperature heat transfer medium) that has fallen in temperature as a result of heat exchange with the second heat transfer medium (low-temperature heat transfer medium) at the seventh heat exchanger (heat transfer medium cooling heat exchanger 80b). The sixth heat exchanger (latent heat recovery heat exchanger 70c) recovers the latent heat of the combustion gas. The combustion energy of the fuel from the burner is efficiently used.

According to a fourteenth aspect of the disclosure, in view of the thirteenth aspect, in the second circuit, the seventh heat exchanger may be located between a portion where the second heat transfer medium flows out from the fourth heat exchanger and a portion where the second heat transfer medium flows into the fifth heat exchanger. In the second circuit, the fifth heat exchanger may be located between a portion where the second heat transfer medium flows out from the fourth heat exchanger and a portion where the second heat transfer medium flows into the third heat exchanger. According to the fourteenth aspect, the seventh heat exchanger (heat transfer medium cooling heat exchanger 80b) is supplied with the third heat transfer medium (medium-temperature heat transfer medium) that is lower in temperature than before rising in temperature by the third heat exchanger (condenser) and the fifth heat exchanger (heat transfer medium heat exchanger). The temperature of the first heat transfer medium (high-temperature heat transfer medium) to be supplied to the sixth heat exchanger (latent heat recovery heat exchanger 70c) is lowered more in temperature. The sixth heat exchanger (latent heat recovery heat exchanger 70c) has an increased recovery rate of the latent image of the combustion gas. The combustion energy of the fuel from the burner is efficiently used.

According to a fifteenth aspect of the disclosure, in view of one of the first through fourteenth aspects, the fourth heat exchanger may constitute a heater or a hot water generator. According to the fifteenth aspect, the heat of the working fluid of the Rankine cycle or the second heat transfer medium (low-temperature heat transfer medium) heated by the first heat source (high-temperature heat transfer medium) is used for heating or hot-water supplying.

According to a sixteenth aspect of the disclosure, in view of one of the first through fifteenth aspects, the cogenerating system may further include a first case that includes the Rankine cycle, and a second case that includes the first heat exchanger. The first case and the second case are connected by a pipe that constitutes the first circuit.

According to the sixteenth aspect, the passage of the working fluid from the outlet of the second heat exchanger (evaporator) to the inlet of the expander is shortened, and a temperature drop of the working fluid flowing from the outlet of the second heat exchanger (evaporator) to the inlet of the expander is controlled.

According to a seventeenth aspect of the disclosure, in view of the first through fifteenth aspects, the cogenerating system may further include a third case that includes the first circuit, the Rankine cycle, and the first heat exchanger. According to the seventeenth aspect, only the pipe forming the second circuit (low-temperature heat transfer medium circuit) is external to the third case. An amount of heat insulator in use is thus reduced, and the installation operation of the cogenerating system is easier. This arrangement cuts down on the costs for manufacturing and installing the cogenerating system.

Embodiments of the disclosure are described below with reference to the drawings. The following discussion is related to only examples of the disclosure, and the disclosure is not limited to the embodiments.

First Embodiment

As illustrated in FIG. 1, a cogenerating system 1a includes a Rankine cycle 30, a high-temperature heat transfer medium circuit 40 (first circuit), a low-temperature heat transfer medium circuit 50 (second circuit), a bypass channel 45 (a first bypass channel), a heat transfer medium heat exchanger 60 (fifth heat transfer medium heat exchanger), and a flow rate adjustment mechanism 42. The cogenerating system 1a further includes a burner 11, and a gas passage 13. The burner 11 burns a fuel, thereby generating a combustion gas as a high-temperature heat source (first heat source). The combustion gas generated by the burner 11 flows through the gas passage 13. The high-temperature heat source is not limited to the combustion gas. For example, a heat source, such as waste heat of a plant or geothermal heat, may be used as a high-temperature heat source.

The Rankine cycle 30 includes a pump 31, an evaporator 32 (second heat exchanger), an expander 33, and a condenser 34 (third heat exchanger). These elements are circularly connected in this order by piping. With the pump 31 operating, the working fluid circulates through the Rankine cycle 30. The working fluid includes, but is not limited to water, ketone, alcohol, hydrocarbon, and fluorocarbon. Alcohol may be ethanol. Hydrocarbon may be n-butane or n-pentane. Fluorocarbon may be R134a, R1234yf, R1234ze (E), R236ea, R245fa, or R365mfc.

The high-temperature heat transfer medium circuit 40 includes a high-temperature heat transfer medium heat exchanger 12 (first heat exchanger) that exchanges heat between a high-temperature heat source and a high-temperature heat transfer medium (hereinafter simply referred to as a high-temperature medium). The high-temperature heat transfer medium circuit 40 is configured such that the high-temperature medium is supplied from the high-temperature heat transfer medium heat exchanger 12 to the evaporator 32 and returned from the evaporator 32 to the high-temperature heat transfer medium heat exchanger 12. In other words, a pipe connects the outlet of the high-temperature heat transfer medium heat exchanger 12 to the inlet of the evaporator 32 for the high-temperature medium (high-temperature heat transfer medium) and a pipe connects the outlet of the evaporator 32 for the high-temperature medium to the inlet of the high-temperature heat transfer medium heat exchanger 12. The high-temperature heat transfer medium heat exchanger 12 is disposed on the gas passage 13. The high-temperature heat transfer medium circuit 40 includes a high-temperature heat transfer medium pump 41. The high-temperature heat transfer medium pump 41 may be located between the outlet of the evaporator 32 and the inlet of the high-temperature heat transfer medium heat exchanger 12 in the high-temperature heat transfer medium circuit 40. With the high-temperature heat transfer medium pump 41 operating, the high-temperature heat transfer medium circuit 40 circulates the high-temperature medium. The high-temperature medium is not limited to any particular medium. For example, the high-temperature medium may be a high boiling point material that has a boiling point higher than the operating temperature of the high-temperature medium in the high-temperature heat transfer medium circuit 40. The high-temperature heat transfer medium circuit 40 is filled with the high boiling point material as the high-temperature medium. In this case, the high-temperature medium is mainly in the liquid phase. Since the high-temperature medium in the gas phase is present in the high-temperature heat transfer medium circuit 40 depending on the vapor pressure at the operating temperature, the pressure of the high-temperature medium in the high-temperature heat transfer medium circuit 40 is lower than the atmospheric pressure. If the operating conditions change in the high-temperature heat transfer medium circuit 40 in the cogenerating system 1a, the pressure of the high-temperature medium in the high-temperature heat transfer medium circuit 40 remains low. This leads to lower manufacturing costs. The high boiling point material includes but is not limited to oil. For example, the oil may include silicone oil, mineral oil, or synthetic oil.

The low-temperature heat transfer medium circuit 50 includes a low-temperature medium heat exchanger 20 (fourth heat exchanger) that exchanges heat between a low-temperature heat source (second heat source) and a low-temperature heat transfer medium (hereinafter simply referred to as a low-temperature medium). The low-temperature heat transfer medium circuit 50 is configured such that the low-temperature medium is supplied from the low-temperature medium heat exchanger 20 to the condenser 34 and returned from the condenser 34 to the low-temperature medium heat exchanger 20. In other words, a pipe connects the outlet of the low-temperature medium heat exchanger 20 to the inlet of the condenser 34 for the low-temperature medium and a pipe connects the outlet of the condenser 34 for the low-temperature medium to the inlet of the low-temperature medium heat exchanger 20. The low-temperature heat transfer medium circuit 50 includes a low-temperature heat transfer medium pump 51. The low-temperature heat transfer medium pump 51 is located between the outlet of the low-temperature medium heat exchanger 20 and the inlet of the condenser 34 in the low-temperature heat transfer medium circuit 50. With the low-temperature heat transfer medium pump 51 operating, the low-temperature medium circulates through the low-temperature heat transfer medium circuit 50. The low-temperature medium is not limited to any particular substance. For example, the low-temperature medium may be water. Also, the low-temperature medium may be a gas, such as air.

Referring to FIG. 1, a heater 21 and a hot water generator 22 are disposed as a low-temperature medium heat exchanger 20 in the low-temperature heat transfer medium circuit 50. The heater 21 is disposed in the low-temperature heat transfer medium circuit 50 such that the heater 21 is located downstream of the outlet of the hot water generator 22 in the flowing direction of the low-temperature medium. The heater 21 or the hot water generator 22 may be dispensed with. In other words, the low-temperature medium heat exchanger 20 may be either the heater 21 or the hot water generator 22. The heater 21 is in contact with surrounding substances, and radiates heat of the low-temperature medium to the surrounding substances as a low-temperature heat source to heat a room. The surrounding substances may be room air or a material forming the walls of the room. The hot water generator 22 transfers heat of the low-temperature medium to heat tap water as a low-temperature source. The hot water generator 22 may include a water storage tank 22a and a pipe 22b. The water storage tank 22a temporarily stores the low-temperature medium. The pipe 22b is a coiled pipe arranged inside the water storage tank 22a. Tap water flows through the pipe 22b. Heat of the low-temperature medium heated by the working fluid of the Rankine cycle 30 is used for heating and hot water generating. Energy is thus efficiently used.

The bypass channel 45 is connected to the high-temperature heat transfer medium circuit 40 such that the high-temperature medium bypasses the evaporator 32. One end of the bypass channel 45 is connected to the connection location 40a (first portion) of the high-temperature heat transfer medium circuit 40 and the other end of the bypass channel 45 is connected to a connection location 40b (second portion) of the high-temperature heat transfer medium circuit 40. The connection location 40a is located between the outlet of the high-temperature heat transfer medium heat exchanger 12 and the inlet of the evaporator 32 in the high-temperature heat transfer medium circuit 40. The connection location 40b is located between the outlet of the evaporator 32 and the net of the high-temperature heat transfer medium heat exchanger 12 in the high-temperature heat transfer medium circuit 40. The connection location 40b is, for example, located between the outlet of the evaporator 32 and the inlet of the high-temperature heat transfer medium pump 41 in the high-temperature heat transfer medium circuit 40.

The heat transfer medium heat exchanger 60 exchanges heat between the high-temperature medium flowing through the bypass channel 45 and the low-temperature medium flowing through the side of the low-temperature heat transfer medium circuit 50 upstream of the inlet of the low-temperature medium heat exchanger 20 in the flowing direction of the low-temperature medium. The bypass channel 45 and the heat transfer medium heat exchanger 60 directly transfers the heat of the high-temperature medium to the low-temperature medium without the Rankine cycle 30. Even if the quantity of heat to be transferred from the working fluid to the low-temperature medium at the condenser 34 is not sufficient for the heat demand at the low-temperature medium heat exchanger 20, the heat to power ratio of the cogenerating system 1a may be adapted to the heat demand. The heat transfer medium heat exchanger 60 is disposed downstream of the outlet of the condenser 34 in the low-temperature heat transfer medium circuit 50 in the flowing direction of the low-temperature medium discharged by the low-temperature heat transfer medium pump 51. In this case, the condenser 34 is supplied with the low-temperature medium lower in temperature than the low-temperature medium supplied to the heat transfer medium heat exchanger 60. Since a temperature difference between the high-temperature medium to be supplied to the evaporator 32 and the low-temperature medium to be supplied to the condenser 34 is larger, the generation efficiency of the Rankine cycle 30 becomes higher.

The flow rate adjustment mechanism 42 includes at least a flow rate limiter, and adjusts a ratio of flow rate Fb of the high-temperature medium flowing through the bypass channel 45 and a flow rate Fa of the high-temperature medium to be supplied to the evaporator 32 (Fb/Fa). The flow rate herein refers to a mass flow rate. The flow rate limiter is located downstream of the connection location 40a of the high-temperature heat transfer medium circuit 40. The connection location 40a is located upstream of the inlet of the evaporator 32 in the flowing direction of the high-temperature medium. A flow rate limiter limits the flow rate of the high-temperature medium to be supplied to the evaporator 32. Since the flow rate limiter substantially reduces the flow rate Fa, the range of the ratio Fb/Fa adjustable by the flow rate adjustment mechanism 42 is wide. For this reason, the cogenerating system 1a is adaptable to a high level of heat demand.

The flow rate adjustment mechanism 42 includes a main flow rate adjustment valve 42a (first valve) and a bypass flow rate adjustment valve 42b (second valve), for example. The main flow rate adjustment valve 42a is disposed as a flow rate controller at a location downstream of the connection location 40a of the high-temperature heat transfer medium circuit 40. For example, the main flow rate adjustment valve 42a is disposed between the connection location 40a of the high-temperature heat transfer medium circuit 40 and the inlet of the evaporator 32. The bypass flow rate adjustment valve 42b is disposed on the bypass channel 45. The main flow rate adjustment valve 42a may be a motor-operated valve that is adjustable in the degree of opening. The bypass flow rate adjustment valve 42b may also be a motor-operated valve that is adjustable in the degree of opening. The ratio Fb/Fa is finely adjustable within a wide range by controlling the degree of opening of the main flow rate adjustment valve 42a and the degree of opening of the bypass flow rate adjustment valve 42b. For example, the degree of opening of the main flow rate adjustment valve 42a and the degree of opening of the bypass flow rate adjustment valve 42b may be controlled by a controller (not illustrated), such as a digital signal processor (DSP). In this way, the ratio Fb/Fa may be adjusted to an appropriate value adapted to the heat demand. The high-temperature medium may be supplied to only the evaporator 32. In such a case, as well, an increase in the pressure loss in the flow of the high-temperature medium in the high-temperature heat transfer medium circuit 40 is controlled by fully opening the main flow rate adjustment valve 42a. In this case, motive power required of the high-temperature heat transfer medium pump 41 is reduced. The heat to power ratio of the cogenerating system 1a is efficiently adapted to the heat demand while the Rankine cycle 30 generates power.

As illustrated in FIG. 1, the cogenerating system 1a includes a Rankine cycle case 5a (first case), and a high-temperature heat source case 5b (second case). The Rankine cycle case 5a contains the Rankine cycle 30. As illustrated in FIG. 1, the Rankine cycle case 5a may contain the heat transfer medium heat exchanger 60, the low-temperature heat transfer medium pump 51 the bypass channel 45, or the flow rate adjustment mechanism 42. The high-temperature heat source case 5b is arranged as a case separated from the Rankine cycle case 5a, and at least contains the high-temperature heat transfer medium heat exchanger 12. As illustrated in FIG. 1, the high-temperature heat source case 5b may contain the burner 11, the gas passage 13, or the high-temperature heat transfer medium pump 41. The Rankine cycle case 5a and the high-temperature heat source case 5b are connected to each other via pipes forming the high-temperature heat transfer medium circuit 40. In this case, the circuit of the working fluid from the outlet of the evaporator 32 to the inlet of the expander 33 is shortened. As a result, a temperature drop in the working fluid flowing from the outlet of the evaporator 32 to the inlet of the expander 33 is controlled. The Rankine cycle 30 increases in power generation efficiency.

An example of an operation of the cogenerating system 1a is described below. The cogenerating system 1a operates in response to a request for hot water supplying or a request for heating. If there is no such request, the cogenerating system 1a is not active. When the cogenerating system 1a is operating, the working fluid, the high-temperature medium, and the low-temperature medium flow as illustrated in FIG. 1. As illustrated in FIG. 1, each arrow-headed solid line indicates the flow of the working fluid in the Rankine cycle 30. Each arrow-headed broken line indicates the flow of the high-temperature medium in the high-temperature heat transfer medium circuit 40. Each arrow-headed dot-dash line indicates the flow of the low-temperature medium of the low-temperature heat transfer medium circuit 50.

When a hot water tap (not illustrated) is opened, tap water is supplied to the pipe 22b of the hot water generator 22. The pipe 22b is supplied with tap water lower in temperature than the low-temperature medium stored on the water storage tank 22a. The tap water is heated by heat exchanging with the low-temperature medium at the low-temperature medium heat exchanger 20. On the other hand, the low-temperature medium stored in the water storage tank 22a is lowered in temperature. If the low-temperature medium stored in the water storage tank 22a is lowered in temperature below a set temperature, the cogenerating system 1a is controlled to operate. For example, if a remote control (not illustrated) is operated to instruct the heater 21 to perform a heating operation, the cogenerating system 1a is controlled to operate.

When the cogenerating system 1a starts operating, the low-temperature heat transfer medium pump 51 is caused to operate to circulate the low-temperature medium through the low-temperature heat transfer medium circuit 50. With the pump 31 in the Rankine cycle 30 operated, the working fluid is circulated through the Rankine cycle 30. With the high-temperature heat transfer medium pump 41 operated, the high-temperature medium is circulated through the high-temperature heat transfer medium circuit 40. The burner 11 then burns the fuel. A high-temperature combustion gas generated by the burner 11 heats the high-temperature medium at the high-temperature heat transfer medium heat exchanger 12. The high-temperature medium raised in temperature by the high-temperature heat transfer medium heat exchanger 12 is supplied to the evaporator 32. The evaporator 32 exchanges heat between the high-temperature medium and the working fluid of the Rankine cycle 30 to evaporate the working fluid. When the superheated vapor of the working fluid generated at the evaporator 32 is decompressed by the expander 33, a generator (not illustrated) connected to the expander 33 is driven to generate electricity. The condenser 34 exchanges heat between the superheated vapor of the working fluid decompressed by the expander 33 and the low-temperature medium, thereby heating the low-temperature medium.

Since the low-temperature medium raised in temperature at the condenser 34 is supplied to the water storage tank 22a, the low-temperature medium stored in the water storage tank 22a rises in temperature. The hot water generator 22 thus generates hot water at a predetermined temperature. The heater 21 radiates heat in response to the low-temperature medium raised in temperature at the condenser 34. The heater 21 thus performs a heating operation.

Whole or part of the high-temperature medium is guided into the bypass channel 45 to be supplied to the heat transfer medium heat exchanger 60 rather than the evaporator 32 by controlling the degree of opening of the main flow rate adjustment valve 42a and the degree of opening of the bypass flow rate adjustment valve 42b. The high-temperature medium is thus supplied to the heat transfer medium heat exchanger 60. In this way, the low-temperature medium is directly heated by the high-temperature medium without using the Rankine cycle 30. Using the flow rate adjustment mechanism 42, the bypass channel 45 and the heat transfer medium heat exchanger 60 are supplied with the high-temperature medium such that the ratio Fb/Fa is set to be any value. The heat to power ratio of the cogenerating system 1a is thus adapted to the heat demand while power is generated.

Modifications

Figure 2:
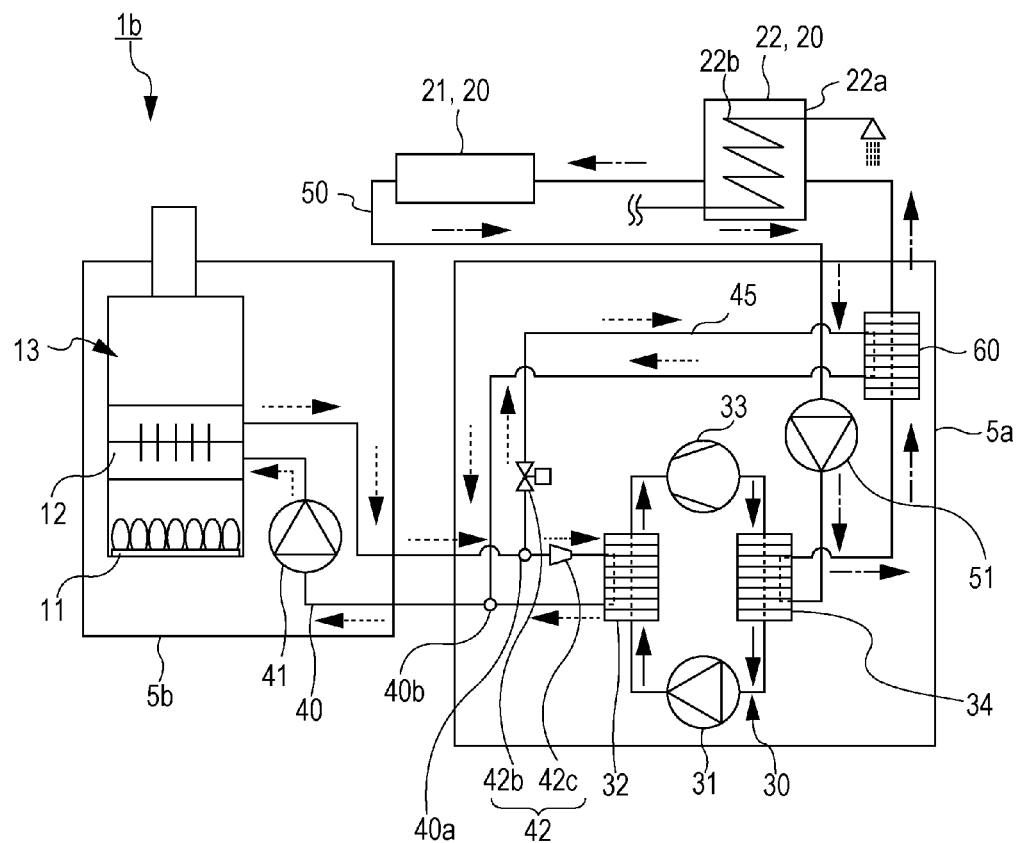
FIG. 2 illustrates the configuration of a cogenerating system of a first modification of the first embodiment.

The cogenerating system 1a is modified from various points of view. For example, the cogenerating system 1a may be modified to be a cogenerating system 1b as a first modification as illustrated in FIG. 2. The cogenerating system 1b is identical in configuration to the cogenerating system 1a unless otherwise specifically described below. Elements forming the cogenerating system 1b identical to those of the cogenerating system 1a are designated with the same reference numerals and the detailed discussion thereof is omitted herein. This is true of second and third modifications.

As illustrated in FIG. 2, in the cogenerating system 1b, the flow rate adjustment mechanism 42 includes a fixed throttle unit 42c and a bypass flow rate adjustment valve 42b. The fixed throttle unit 42c is disposed as a flow rate controller at a location downstream of the connection location 40a in the high-temperature heat transfer medium circuit 40. For example, the fixed throttle unit 42c is disposed between the connection location 40a and the inlet of the evaporator 32 in the high-temperature heat transfer medium circuit 40. The fixed throttle unit 42c has a passage narrower than the passage formed by the pipe upstream of the fixed throttle unit 42c in the flowing direction of the high-temperature medium. The bypass flow rate adjustment valve 42b is disposed on the bypass channel 45. If the heat demand is lower, the flow rate of the high-temperature medium to be supplied to the heat transfer medium heat exchanger 60 is reduced by decreasing the degree of opening of the bypass flow rate adjustment valve 42b. If the bypass flow rate adjustment valve 42b is fully closed, the high-temperature medium is supplied to only the evaporator 32. If the heat demand is higher, the ratio Fb/Fa is increased by increasing the degree of opening of the bypass flow rate adjustment valve 42b. An amount of heat from the high-temperature medium transferred to the low-temperature medium is thus adapted to the heat demand. Since the number of valves included in the flow rate adjustment mechanism 42 is smaller, the manufacturing costs are reduced. The heat to power ratio of the cogenerating system is efficiently adapted to the heat demand while power is generated.

Figure 3:
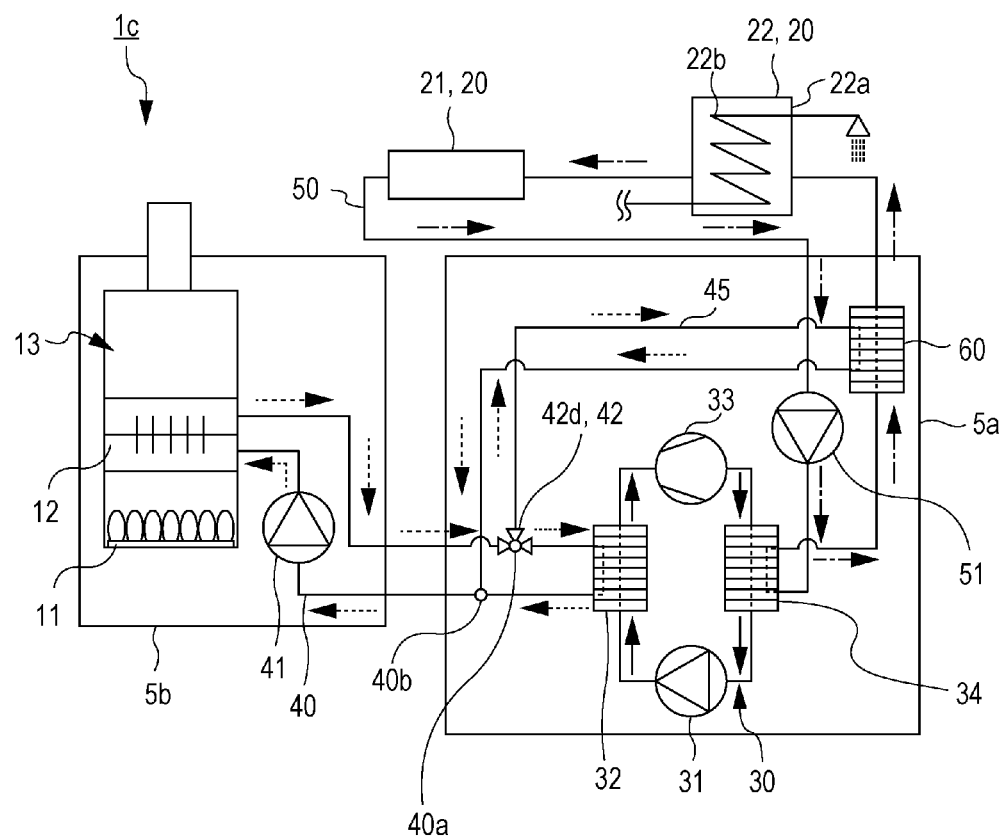
FIG. 3 illustrates the configuration of a cogenerating system of a second modification of the first embodiment.

The cogenerating system 1a may be modified to be a cogenerating system 1c as a second modification as illustrated in FIG. 3. The cogenerating system 1c includes a flow rate three-way valve 42d in place of the main flow rate adjustment valve 42a and the bypass flow rate adjustment valve 42b in the cogenerating system 1a. The rest of the cogenerating system 1c is identical in configuration to the cogenerating system 1a. In the cogenerating system 1c, the flow rate adjustment mechanism 42 includes the flow rate three-way valve 42d. The flow rate three-way valve 42d is disposed as a flow rate controller at the connection location 40a. The flow rate three-way valve 42d is a motor-operated three-way valve. The ratio Fb/Fa may be adjusted to any value by causing a control device (not illustrated) to control the degree of opening the flow rate three-way valve 42d. Since the ratio Fb/Fa is adjusted by controlling only the flow rate three-way valve 42d, the component count is reduced, leading to cutting down on the manufacturing costs. Even if the degree of opening of the flow rate three-way valve 42d is controlled such that the high-temperature medium is supplied to only the evaporator 32, an increase in the pressure loss in the flow of the high-temperature medium is restrained. In this case, motive power required of the high-temperature heat transfer medium pump 41 is reduced. The heat to power ratio of the cogenerating system 1c is efficiently adapted to the heat demand while power is generated.

Figure 4:
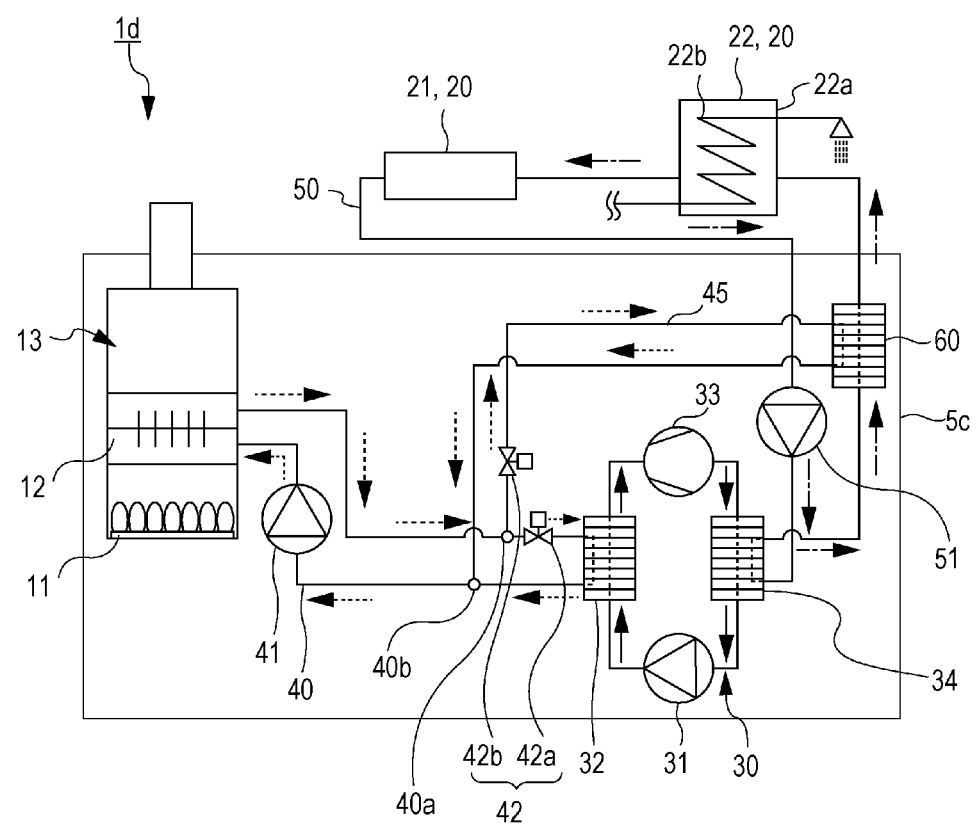
FIG. 4 illustrates the configuration of a cogenerating system of a third modification of the first embodiment.

The cogenerating system 1a may be modified to be a cogenerating system 1d as a third modification as illustrated in FIG. 4. As illustrated in FIG. 4, the cogenerating system 1d includes a large-sized case 5c (third case). The cogenerating system 1d includes the large-sized case 5c in place of the Rankine cycle case 5a and the high-temperature heat source case 5b in the cogenerating system is. The rest of the cogenerating system 1d is identical in configuration to the cogenerating system 1a. The large-sized case 5c contains the Rankine cycle 30, the high-temperature heat transfer medium heat exchanger 12, and the high-temperature heat transfer medium circuit 40. This arrangement reduces the externally exposed piping of the system outside the large-sized case 5c, and thus reduces an amount of a heat insulator to be used. The installation operation of the cogenerating system 1c is easier. Referring to FIG. 4, the large-sized case 5c may contain the burner 11, at least part of the gas passage 13, the high-temperature heat transfer medium pump 41, the bypass channel 45, the flow rate adjustment mechanism 42, the low-temperature heat transfer medium pump 51, the heat transfer medium heat exchanger 60, or part of the low-temperature heat transfer medium circuit 50.

Figure 5A:
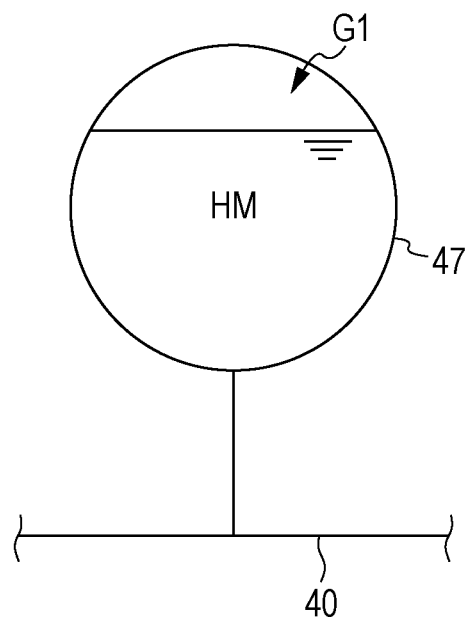
FIG. 5A diagrammatically illustrates an example of a high-temperature expansion tank.
Figure 5B:
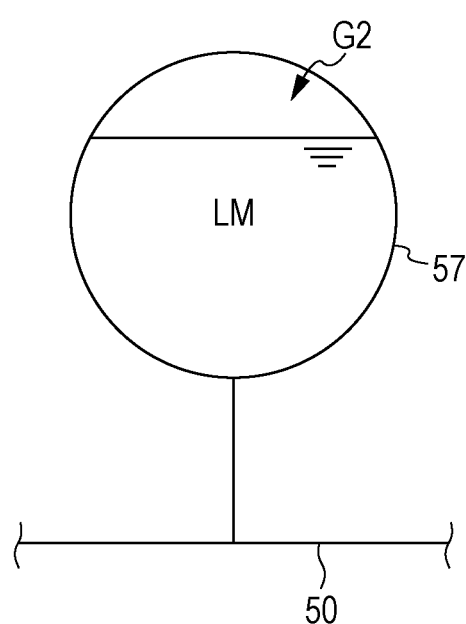
FIG. 5B diagrammatically illustrates an example of a low-temperature expansion tank.

As illustrated in FIG. 5A and FIG. 5B, the cogenerating system 1a may further include a high-temperature expansion tank 47 (first tank) and a low-temperature expansion tank 57 (second tank). The high-temperature expansion tank 47 is disposed on the high-temperature heat transfer medium circuit 40 and contains part of the high-temperature medium. The high-temperature expansion tank 47 is partially filled with a gas G1. The gas G1 may be air, for example. If the volume of the high-temperature medium increases in the high-temperature heat transfer medium circuit 40, part of a high-temperature medium HM is guided into the high-temperature expansion tank 47 as illustrated in FIG. 5A. In this way, a pressure rise in the high-temperature heat transfer medium circuit 40 is alleviated. The low-temperature expansion tank 57 is disposed in the low-temperature heat transfer medium circuit 50 and contains part of the low-temperature medium. The low-temperature expansion tank 57 is partially filled with a gas G2. The gas G2 may be air, for example. If the volume of the low-temperature medium increases in the low-temperature heat transfer medium circuit 50, part of the low-temperature medium LM is guided into the low-temperature expansion tank 57 as illustrated in FIG. 5B. In this way, a pressure rise in the low-temperature heat transfer medium circuit 50 is alleviated. This arrangement increases the reliability of the operation of the high-temperature heat transfer medium circuit 40 or the low-temperature heat transfer medium circuit 50 in response to a change in the operating conditions of the cogenerating system, leading to an increase in the reliability of the cogenerating system.

The location where the high-temperature expansion tank 47 is mounted is not limited to any particular location. For example, the high-temperature expansion tank 47 may be located between the outlet of the evaporator 32 and the inlet of the high-temperature heat transfer medium heat exchanger 12 in the high-temperature heat transfer medium circuit 40. Since the temperature of the high-temperature medium near the high-temperature expansion tank 47 is relatively low, heat resistance required of the high-temperature expansion tank 47 is also low.

The location where the low-temperature expansion tank 57 is mounted is not limited to any particular location. For example, the low-temperature expansion tank 57 may be disposed between the outlet of the low-temperature medium heat exchanger 20 and the inlet of the condenser 34 in the low-temperature heat transfer medium circuit 50. Since the temperature of the low-temperature medium near the low-temperature expansion tank 57 is relatively low, heat resistance required of the low-temperature expansion tank 57 is also low.

Second Embodiment

A cogenerating system 1e of a second embodiment is described. The cogenerating system 1e is identical in configuration to the cogenerating system 1a unless otherwise specified below. Elements of the cogenerating system 1e identical to or corresponding to those of the cogenerating system 1a are designated with the same reference numerals and the detailed discussion thereof is omitted. The discussion of the first embodiment and the modifications thereof is also applicable to the second embodiment unless a technical contradiction occurs. This is true of third and fourth embodiments.

Figure 6:
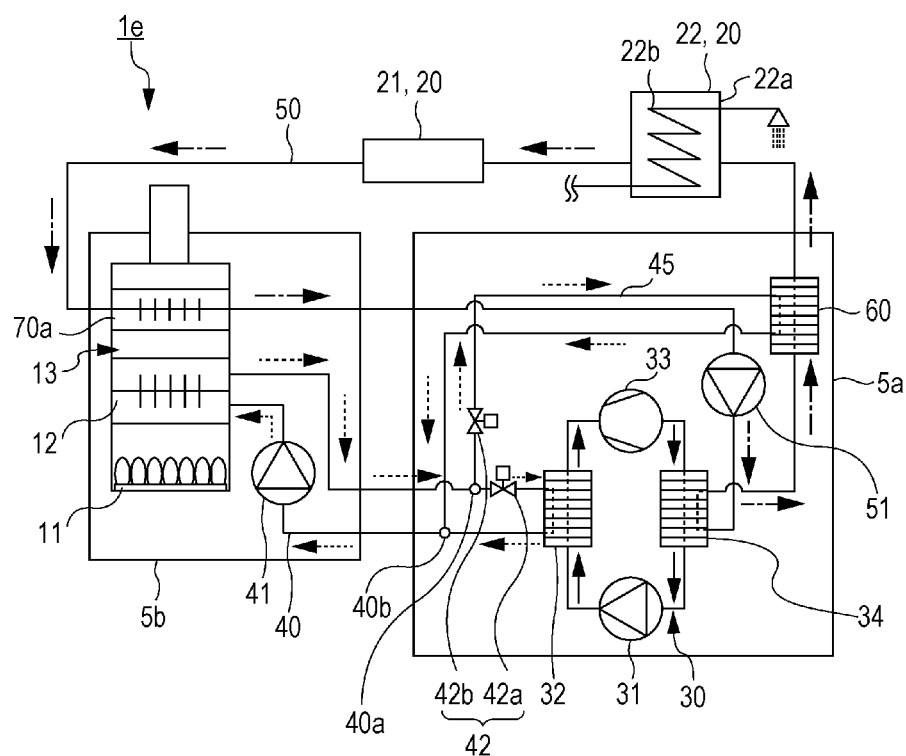
FIG. 6 illustrates the configuration of a cogenerating system of a second embodiment of the disclosure.

As illustrated in FIG. 6, the cogenerating system 1e further includes a latent heat recovery heat exchanger 70a (sixth heat exchanger). The latent heat recovery heat exchanger 70a exchanges heat between the combustion gas as a high-temperature heat source and the low-temperature medium. The latent heat recovery heat exchanger 70a is disposed on the gas passage 13 downstream of the high-temperature heat transfer medium heat exchanger 12 in the flowing direction of the combustion gas, and on a portion of the low-temperature heat transfer medium circuit 50 upstream of the inlet of the condenser 34 in the flowing direction of the low-temperature medium. The latent heat recovery heat exchanger 70a is disposed on a portion of the low-temperature heat transfer medium circuit 50 downstream of the outlet of the low-temperature medium heat exchanger 20 in the flowing direction of the low-temperature medium.

The high-temperature heat transfer medium heat exchanger 12 exchanges heat between the combustion gas generated when the burner 11 burns the fuel and the high-temperature medium. As a result, the high-temperature heat transfer medium heat exchanger 12 heats the high-temperature medium with the high-temperature heat source to a predetermined temperature. The latent heat recovery heat exchanger 70a exchanges heat between the combustion gas having flown through the high-temperature heat transfer medium heat exchanger 12 and the low-temperature medium lower in temperature prior to the heat exchange with the working fluid of the Rankine cycle 30 at the condenser 34. As a result, the latent heat recovery heat exchanger 70a recovers the latent heat of the combustion gas. The combustion gas contains vapor. For example, the latent heat recovery heat exchanger 70a recovers the latent heat by condensing the vapor contained in the combustion gas. As a result, the combustion energy of the fuel from the burner 11 is efficiently used. The latent heat recovered by the latent heat recovery heat exchanger 70a is radiated from the low-temperature medium heat exchanger 20 and is used for heating or hot water supplying.

Third Embodiment

Figure 7:
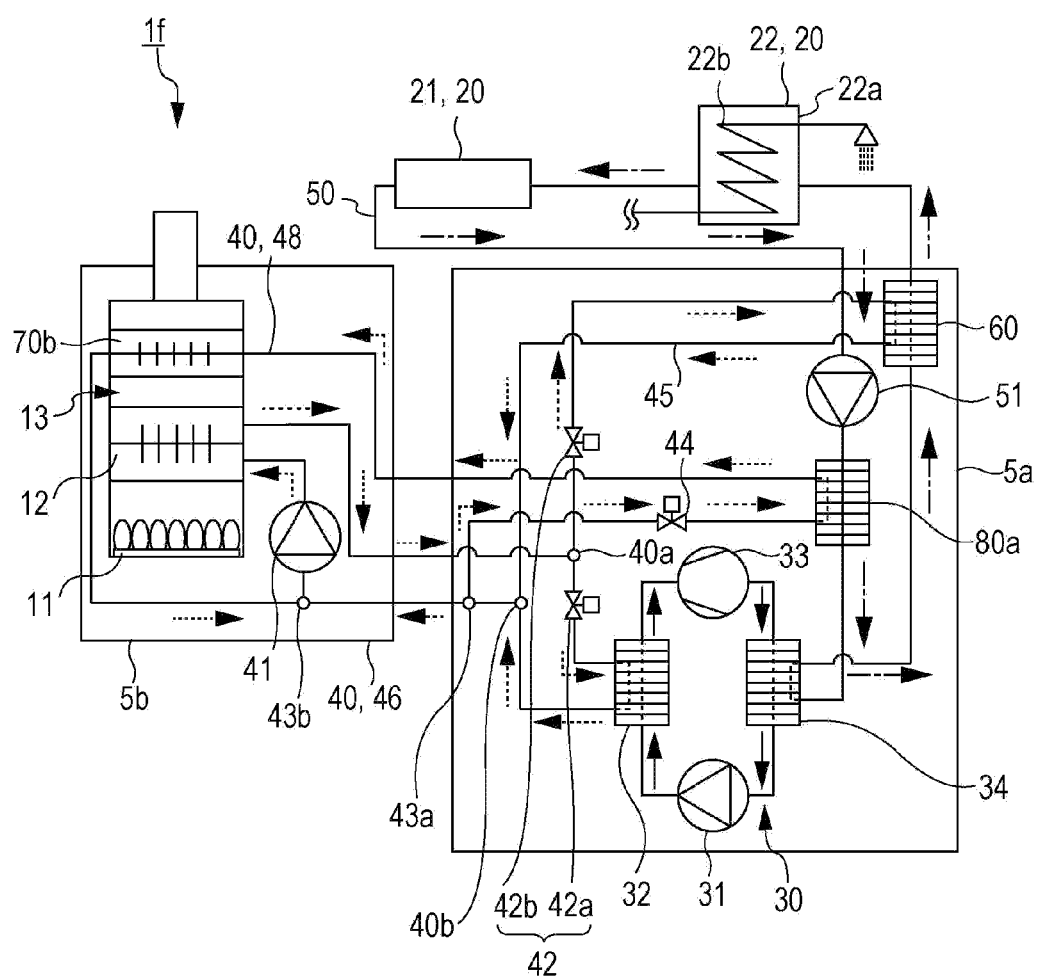
FIG. 7 illustrates the configuration of a cogenerating system of a third embodiment of the disclosure.

A cogenerating system 1f of a third embodiment is described below. The cogenerating system 1f is identical in configuration to the cogenerating system 1a unless otherwise particularly described below. As illustrated in FIG. 7, the cogenerating system 1f further includes a latent heat recovery heat exchanger 70b. The latent heat recovery heat exchanger 70b exchanges heat between the combustion gas as a high-temperature heat source and the high-temperature medium. The latent heat recovery heat exchanger 70b is disposed in the gas passage 13 downstream of the high-temperature heat transfer medium heat exchanger 12 in the flow direction of the combustion gas and in a portion of the high-temperature heat transfer medium circuit 40 downstream of the outlet of the evaporator 32 in the flow direction of the high-temperature medium. For example, the latent heat recovery heat exchanger 70b is disposed in a portion of the high-temperature heat transfer medium circuit 40 upstream of the inlet of the high-temperature heat transfer medium heat exchanger 12 in the flow direction of the high-temperature medium.

The high-temperature heat transfer medium heat exchanger 12 exchanges heat between the combustion gas caused when the burner 11 burns the fuel and the high-temperature medium. As a result, the high-temperature heat transfer medium heat exchanger 12 heats the high-temperature medium with the high-temperature heat source to a predetermined temperature. The latent heat recovery heat exchanger 70b exchanges heat between the combustion gas having flown through the high-temperature heat transfer medium heat exchanger 12 and the high-temperature medium lowered in temperature as a result of the heat exchange with the working fluid of the Rankine cycle 30 at the evaporator 32. As a result, the latent heat recovery heat exchanger 70b recovers the latent heat of the combustion gas. The combustion energy of the fuel from the burner 11 is efficiently used. The latent heat recovered by the latent heat recovery heat exchanger 70b heats the high-temperature medium and pre-heats the high-temperature medium to be supplied to the high-temperature heat transfer medium heat exchanger 12.

As illustrated in FIG. 7, the cogenerating system 1f may include a heat transfer medium cooling heat exchanger 80a (seventh heat exchanger). The heat transfer medium cooling heat exchanger 80a exchanges heat between the high-temperature medium and the low-temperature medium. For example, the heat transfer medium cooling heat exchanger 80a may be located between the outlet of the evaporator 32 and the inlet of the latent heat recovery heat exchanger 70b in the high-temperature heat transfer medium circuit 40. For example, the heat transfer medium cooling heat exchanger 80a may be disposed in a portion of the low-temperature heat transfer medium circuit 50 upstream of the inlet of the condenser 34 in the flow direction of the low-temperature medium. For example, the heat transfer medium cooling heat exchanger 80a may be disposed in a portion of the low-temperature heat transfer medium circuit 50 upstream of the inlet of the heat transfer medium heat exchanger 60 in the flow direction of the low-temperature medium. For example, the heat transfer medium cooling heat exchanger 80a may be disposed in a portion of the low-temperature heat transfer medium circuit 50 downstream of the outlet of the low-temperature medium heat exchanger 20 in the flow direction of the low-temperature medium.

The latent heat recovery heat exchanger 70b exchanges heat between the combustion gas having flown through the high-temperature heat transfer medium heat exchanger 12 and the high-temperature medium lowered in temperature as a result of the heat exchange with the low-temperature medium at the heat transfer medium cooling heat exchanger 80a. In this way, the latent heat recovery heat exchanger 70b recovers the latent heat of the combustion gas. The heat transfer medium cooling heat exchanger 80a is supplied with the low-temperature medium having a lower temperature before being supplied to the condenser 34 or the heat transfer medium heat exchanger 60. The temperature of the high-temperature medium to be supplied to the latent heat recovery heat exchanger 70b is lowered. As a result, the latent heat recovery heat exchanger 70b provides an increased recovery rate of the latent heat of the combustion gas.

Referring to FIG. 7, the cogenerating system 1f includes a third valve 44. The third valve 44 is a motor-operated valve that allows the degree of opening thereof to be adjustable. In the cogenerating system 1f, the high-temperature heat transfer medium circuit 40 includes a main channel 46 and a sub channel 48 (second bypass channel). The sub channel 48 is connected to the main channel 46 such that the high-temperature medium bypasses the main channel 46. The latent heat recovery heat exchanger 70b, the heat transfer medium cooling heat exchanger 80a, and the third valve 44 are disposed in the sub channel 48. In other words, the main channel 46 is configured such that the high-temperature medium flows bypassing the heat transfer medium cooling heat exchanger 80a and the latent heat recovery heat exchanger 70b. The sub channel 48 is configured such that the high-temperature medium flows through the heat transfer medium cooling heat exchanger 80a and the latent heat recovery heat exchanger 70b. A control device (not illustrated) controls the degree of opening of the third valve 44, thereby adjusting the flow rate of the high-temperature medium flowing through the sub channel 48, namely, the flow rate of the high-temperature medium to be supplied to the heat transfer medium cooling heat exchanger 80a and the latent heat recovery heat exchanger 70b. The temperature of the high-temperature medium having flown through the heat transfer medium cooling heat exchanger 80a is thus adjusted. For example, the third valve 44 reduces the flow rate of the high-temperature medium flowing through the sub channel 48, thereby lowering in temperature the high-temperature medium having flown through the heat transfer medium cooling heat exchanger 80a.

One end of the sub channel 48 is connected to a location of the main channel 46 upstream of the inlet of the high-temperature heat transfer medium heat exchanger 12 in the flow direction of the high-temperature medium, and the other end of the sub channel 48 is connected to a location of the main channel 46 that is closer to the inlet of the high-temperature heat transfer medium heat exchanger 12 than the one end of the sub channel 48 is. The high-temperature medium flows from the one end of the sub channel 48 to the other end of the sub channel 48. The high-temperature medium guided into the sub channel 48 after flowing through the latent heat recovery heat exchanger 70b meets the flow the high-temperature medium in the main channel 46 at the location closer to the inlet of the high-temperature heat transfer medium heat exchanger 12. The pressure loss in the flow of the high-temperature medium in the high-temperature heat transfer medium circuit 40 guides the high-temperature medium to the sub channel 48. For example, the one end of the sub channel 48 and the other end of the sub channel 48 are respectively connected to a connection location 43a (third portion) and a connection location 43b (fourth portion) in the main channel 46 in the high-temperature heat transfer medium circuit 40. The connection location 43a and the connection location 43b are located between the outlet of the evaporator 32 and the inlet of the high-temperature heat transfer medium heat exchanger 12 in the high-temperature heat transfer medium circuit 40. The connection location 43b is located downstream of the connection location 43a in the flowing direction of the high-temperature medium. In this case, the sub channel 48 is supplied with the high-temperature medium that is lowered in temperature as a result of heat exchange with the working fluid of the Rankine cycle 30 at the evaporator 32. Note that the one end of the sub channel 48 may be located between the outlet of the high-temperature heat transfer medium heat exchanger 12 and the inlet of the evaporator 32.

Fourth Embodiment

Figure 8:
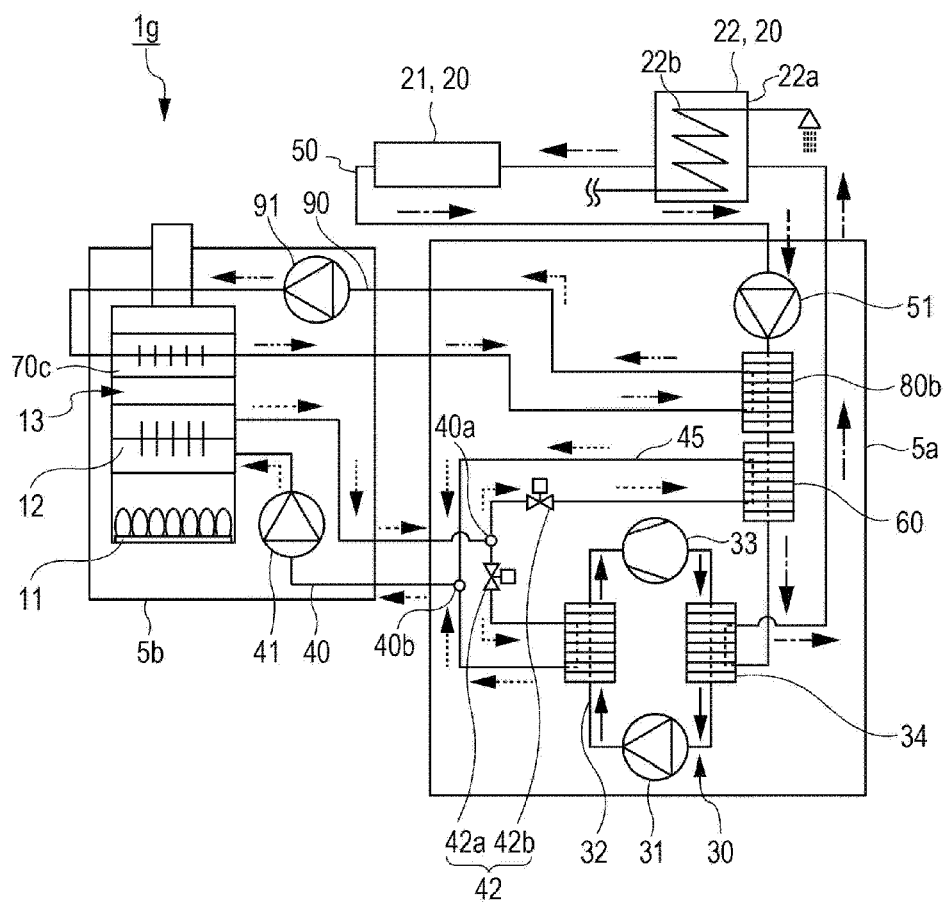
FIG. 8 illustrates the configuration of a cogenerating system of a fourth embodiment of the disclosure.
Figure 9:
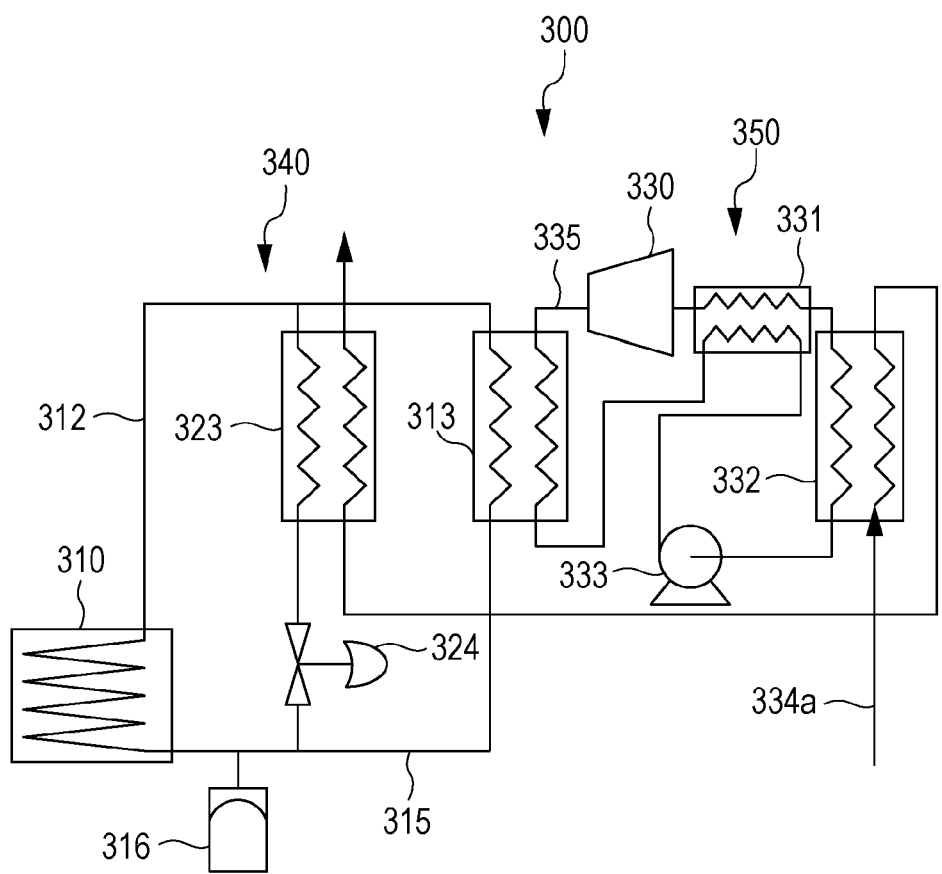
FIG. 9 illustrates the configuration of a Rankine cycle of related art.

A cogenerating system 1g of a fourth embodiment is described below. The cogenerating system 1g is identical in configuration to the cogenerating system 1a unless otherwise particularly described below. As illustrated in FIG. 8, the cogenerating system 1g further includes a medium-temperature heat transfer medium circuit 90 (third circuit). The medium-temperature medium circuit 90 includes a latent heat recovery heat exchanger 70c and a heat transfer medium cooling heat exchanger 80b. A medium-temperature medium (third heat transfer medium) circulates through the medium-temperature medium circuit 90. The latent heat recovery heat exchanger 70c exchanges heat between the combustion gas and the medium-temperature medium. The latent heat recovery heat exchanger 70c is disposed in a portion of the flow direction of the combustion gas in the gas passage 13 downstream of the high-temperature heat transfer medium heat exchanger 12. The heat transfer medium cooling heat exchanger 80b exchanges heat between the low-temperature medium and the medium-temperature medium. The medium-temperature heat transfer medium circuit 90 may include a medium-temperature heat transfer medium pump 91. With the medium-temperature heat transfer medium pump 91 operating, the medium-temperature medium circulates through the medium-temperature heat transfer medium circuit 90. Each arrow-headed chain line with two dots indicates the flowing direction of the medium-temperature medium as illustrated in FIG. 8. The medium-temperature medium is not limited to any particular substance. For example, a fluid having a saturated vapor pressure in absolute pressure equal to or below the atmospheric pressure within an operating temperature range is desirably used. For example, the medium-temperature medium may be oil. The oil may include silicone oil, mineral oil, or synthetic oil. The medium-temperature medium may also be a fluid, such as water.

The high-temperature heat transfer medium heat exchanger 12 exchanges heat between the combustion gas generated by the burner 11 and the high-temperature medium. The high-temperature heat source having a high temperature heats the high-temperature medium to a predetermined temperature. The latent heat recovery heat exchanger 70c exchanges heat between the combustion gas having flown through the high-temperature heat transfer medium heat exchanger 12 and the medium-temperature medium that is lowered in temperature as a result of heat exchange with the low-temperature medium at the heat transfer medium cooling heat exchanger 80b. the latent heat recovery heat exchanger 70c thus recovers the latent heat of the combustion gas. As a result, the combustion energy of the fuel from the burner 11 is efficiently used. The latent heat recovered by the latent heat recovery heat exchanger 70c indirectly heats the low-temperature medium. The latent heat recovered by the latent heat recovery heat exchanger 70c is thus used for a heating operation or a hot water supplying operation.

As illustrated in FIG. 8, the heat transfer medium cooling heat exchanger 80b is disposed on a location of the low-temperature heat transfer medium circuit 50 upstream of the inlet of the heat transfer medium heat exchanger 60 and the inlet of the condenser 34 in the flowing direction of the low-temperature medium. The heat transfer medium cooling heat exchanger 80b is disposed on a location of the low-temperature heat transfer medium circuit 50 downstream of the outlet of the low-temperature medium heat exchanger 20 in the flowing direction of the low-temperature medium. In this way, the heat transfer medium cooling heat exchanger 80b is supplied with the low-temperature medium that is lower in temperature before being supplied to the condenser 34 and the heat transfer medium heat exchanger 60. The temperature of the medium-temperature medium to be supplied to the latent heat recovery heat exchanger 70c becomes even lower. The latent heat recovery heat exchanger 70c thus provides an increased recovery rate of the latent heat of the combustion gas.

What is claimed is:

1. A cogenerating system comprising:
a first circuit that circulates a first heat transfer medium flowing therein;
a Rankine cycle that circulates a working fluid flowing therein;
a second circuit that circulates a second heat transfer medium flowing therein, a temperature of the second heat transfer medium being lower than a temperature of the first medium;
a first heat source;
a first heat exchanger that is disposed on the first circuit, transfers heat of the first heat source to the first heat transfer medium, and evaporates the working fluid;
a second heat exchanger that is disposed sharedly on the first circuit and the Rankine cycle, and transfers heat of the first heat transfer medium to the working fluid;
a pump that is disposed on the Rankine cycle, and circulates the working fluid;
an expander that is disposed on the Rankine cycle, and expands the working fluid;
a third heat exchanger that is disposed sharedly on the Rankine cycle and the second circuit, transfers heat of the working fluid to the second heat transfer medium, and condenses the expanded working fluid;
a second heat source having a temperature lower than a temperature of the first heat source; and
a fourth heat exchanger that is disposed on the second circuit, and transfers heat of the second heat transfer medium to the second heat source, wherein the first circuit includes a first portion and a second portion, the first portion being located between a portion where the first heat transfer medium flows out from the first heat exchanger and a portion where the first heat transfer medium flows into the second heat exchanger, the second portion being located between a portion where the first heat transfer medium flows out from the second heat exchanger and a portion where the first heat transfer medium flows into the first heat exchanger,
wherein the cogenerating system further comprises:
a first bypass channel that that connects the first portion to the second portion of the first circuit to flow the first heat transfer medium from the first portion to the second portion;
a fifth heat exchanger that is disposed sharedly on the second circuit and the first bypass channel, and transfers heat of the first heat transfer medium to the second heat transfer medium; and
an adjustment mechanism that adjusts a ratio of an amount of the first heat transfer medium flowing in the first bypass channel to an amount of the first heat transfer medium flowing into the second heat exchanger in the first circuit, and
wherein the adjustment mechanism allows or stops a flow of the first heat transfer medium into the second heat exchanger in the first circuit.

2. The cogenerating system according to claim 1, wherein the adjustment mechanism comprises a first valve and a second valve, the first valve being located between the first portion and the portion where the first heat transfer medium flows into the second heat exchanger in the first circuit, the second valve being located on the first bypass channel.

3. The cogenerating system according to claim 2, wherein the first valve comprises a fixed throttle valve.

4. The cogenerating system according to claim 1, wherein the adjustment mechanism comprises a three way valve, and is located at the first portion of the first circuit.

5. The cogenerating system according to claim 1, wherein in the second circuit, the fifth heat exchanger is located between a portion where the second heat transfer medium flows out from the third heat exchanger and a portion where the second heat transfer medium flows into the fourth heat exchanger.

6. The cogenerating system according to claim 1, further comprising a first tank that is disposed on the first circuit, and stores a part of the first heat transfer medium, or a second tank that is disposed on the second circuit, and stores a part of the second heat transfer medium.

7. The cogenerating system according to claim 1, wherein the boiling point of the first heat transfer medium at atmospheric pressure is higher than an operating temperature of the first heat transfer medium.

8. The cogenerating system according to claim 1, further comprising:
   a burner that generates combustion gas, the combustion gas constituting the first heat source;
   a gas passage where the combustion gas flows; and
   a sixth heat exchanger that is disposed sharedly on the gas passage and the second circuit, recovers latent heat of the combustion gas, and transfers the latent heat of the combustion gas to the second heat transfer medium,
   wherein the first heat exchanger is disposed on the gas passage,
   wherein in the gas passage, the sixth heat exchanger is located downstream of the first heat exchanger in a flowing direction of the combustion gas, and
   wherein in the second circuit, the sixth heat exchanger is located between a portion where the second heat transfer medium flows out from the fourth heat exchanger and a portion where the second heat transfer medium flows into the third heat exchanger.

9. The cogenerating system according to claim 1, wherein the first circuit includes a third portion and a fourth portion, the third portion being located between the second portion and the portion where the first heat transfer medium flows into the first heat exchanger, the fourth portion being located between the third portion and the portion where the first heat transfer medium flows into the first heat exchanger,
   wherein the cogenerating system further comprises:
      a burner that generates combustion gas, the combustion gas constituting the first heat source;
      a gas passage where the combustion gas flows;
      a second bypass channel that connects the third portion to the fourth portion of the first circuit, causing the first heat transfer medium to flow from the third portion to the fourth portion; and
      a sixth heat exchanger that is disposed sharedly on the gas passage and the second bypass channel, and transfers heat of the first heat source to the first heat transfer medium,
   wherein the first heat exchanger is disposed on the gas passage,
   wherein in the gas passage, the sixth heat exchanger is located downstream of the first heat exchanger in a flowing direction of the combustion gas, and
   wherein the cogenerating system further comprises a third valve, located on the second bypass channel.

10. The cogenerating system according to claim 9, further comprising a seventh heat exchanger that is disposed sharedly on the second circuit and the second bypass channel, and transfers heat of the first heat transfer medium to the second heat transfer medium,
   wherein in the second bypass channel, the third portion, the seventh heat exchanger, the sixth heat exchanger and the forth portion are arranged in this order.

11. The cogenerating system according to claim 10, wherein in the second circuit, the seventh heat exchanger is located between a portion where the second heat transfer medium flows out from the fourth heat exchanger and a portion where the second heat transfer medium flows into the third heat exchanger.

12. The cogenerating system according to claim 11, wherein in the second circuit, the fifth heat exchanger is located between a portion where the second heat transfer medium flows out from the third heat exchanger and a portion where the second heat transfer medium flows into the fourth heat exchanger.

13. The cogenerating system according to claim 1, further comprising:
   a burner that generates combustion gas, the combustion gas constituting the first heat source;
   a gas passage where the combustion gas flows;
   a third circuit that circulates a third heat transfer medium flowing therein, a temperature of the third heat transfer medium being lower than a temperature of the first heat transfer medium and being higher than a temperature of the second heat transfer medium; and
   a sixth heat exchanger that is disposed sharedly on the gas passage and the third circuit, and transfers heat of the first heat source to the third heat transfer medium,
   wherein the first heat exchanger is disposed on the gas passage,
   wherein the sixth heat exchanger is located downstream of the first heat exchanger in a flowing direction of the combustion gas in the gas passage, and
   wherein the cogenerating system further comprises a seventh heat exchanger that is disposed sharedly on the second circuit and the third circuit, and transfers heat of the third heat transfer medium to the second heat transfer medium.

14. The cogenerating system according to claim 13, wherein in the second circuit, the seventh heat exchanger is located between a portion where the second heat transfer medium flows out from the fourth heat exchanger and a portion where the second heat transfer medium flows into the fifth heat exchanger, and
   wherein in the second circuit, the fifth heat exchanger is located between a portion where the second heat transfer medium flows out from the fourth heat exchanger and a portion where the second heat transfer medium flows into the third heat exchanger.

15. The cogenerating system according to claim 1, wherein the fourth heat exchanger constitutes a heater or a hot water generator.

16. The cogenerating system according to claim 1, further comprising:
- a first case that includes the Rankine cycle; and
- a second case that includes the first heat exchanger,
- wherein the first case and the second case are connected by a pipe that constitutes the first circuit.

17. The cogenerating system according to claim 1, further comprising a third case that includes the first circuit, the Rankine cycle, and the first heat exchanger.

* * * * *